US012285885B2

(12) United States Patent
Aigner et al.

(10) Patent No.: US 12,285,885 B2
(45) Date of Patent: Apr. 29, 2025

(54) ASSEMBLY FOR GRANULATING EXTRUDED MATERIAL

(71) Applicant: EREMA Engineering Recycling Maschinen und Anlagen Gesellschaft M.B.H., Ansfelden (AT)

(72) Inventors: Michael Aigner, Leonding (AT); Christian Wagner, Neumarkt im (AT); Roland Huber, St. Pantaleon (AT); Klaus Feichtinger, Linz (AT)

(73) Assignee: EREMA Engineering Recycling Maschinen und Anlagen Gesellschaft M.B.H., Ansfelden (AT)

( * ) Notice: Subject to any disclaimer, the term of this patent is extended or adjusted under 35 U.S.C. 154(b) by 0 days.

(21) Appl. No.: 17/768,194

(22) PCT Filed: Oct. 9, 2020

(86) PCT No.: PCT/AT2020/060361
§ 371 (c)(1),
(2) Date: Sep. 27, 2022

(87) PCT Pub. No.: WO2021/068020
PCT Pub. Date: Apr. 15, 2021

(65) Prior Publication Data
US 2024/0083069 A1 Mar. 14, 2024

(30) Foreign Application Priority Data

Oct. 11, 2019 (AT) .............................. A 50870/2019

(51) Int. Cl.
*B29B 9/06* (2006.01)
*B29C 48/00* (2019.01)
(Continued)

(52) U.S. Cl.
CPC ............ *B29B 9/06* (2013.01); *B29C 48/0022* (2019.02); *B29C 48/05* (2019.02); *B29C 48/345* (2019.02); *B29C 48/76* (2019.02)

(58) Field of Classification Search
CPC ......... B29B 9/06; B29B 9/02; B29C 48/0022; B29C 48/05; B29C 48/345; B29C 48/76; B29C 48/04
(Continued)

(56) References Cited

U.S. PATENT DOCUMENTS

| 6,308,570 B1 * | 10/2001 | Jackson ............... G01N 29/348 |
| | | 73/639 |
| 2010/0040716 A1 * | 2/2010 | Fridley .................. B29B 9/065 |
| | | 425/6 |
| 2015/0321410 A1 * | 11/2015 | Eloo ................... B29B 17/0005 |
| | | 425/225 |

FOREIGN PATENT DOCUMENTS

| CN | 203 141 679 U | 8/2013 |
| CN | 203 739 049 U | 7/2014 |

(Continued)

OTHER PUBLICATIONS

International Preliminary Report on Patentability in related International Application No. PCT/AT2020/060361 issued Apr. 12, 2022 (nine pages).

*Primary Examiner* — Nahida Sultana
(74) *Attorney, Agent, or Firm* — Kilpatrick Townsend & Stockton LLP

(57) ABSTRACT

Disclosed is an assembly for granulating polymer material, having a housing; a gas feed conduit having a rectangular cross-section and leading into the housing; a gas discharge conduit located downstream of the housing and having a rectangular cross-section; a granulating unit disposed in the housing and having a perforated plate feeding into the housing and a scraper, which comminutes the material
(Continued)

emerging through openings of the perforated plate. In a plane running parallel to the plane of the perforated plate, the two lateral wall faces of the gas discharge conduit arranged perpendicularly to said plane enclose an angle $\alpha 2$ with one another, and the two lateral wall faces of the gas feed conduit arranged perpendicularly to said plane or plane of section enclose an angle $\alpha 1$, the two angles $\alpha 1$ and $\alpha 2$ being open towards the housing, and the angle $\alpha 1$ being larger than the angle $\alpha 2$.

28 Claims, 7 Drawing Sheets

(51) Int. Cl.
*B29C 48/05* (2019.01)
*B29C 48/345* (2019.01)
*B29C 48/76* (2019.01)

(58) Field of Classification Search
USPC .......................................................... 425/311
See application file for complete search history.

(56) References Cited

FOREIGN PATENT DOCUMENTS

| | | |
|---|---|---|
| CN | 203 888 063 U | 10/2014 |
| CN | 104 385 478 B | 2/2017 |
| DE | 1 283 486 B | 11/1964 |
| EP | 2 052 825 A2 | 10/2008 |
| EP | 3 043 973 B1 | 9/2014 |
| KR | 10-2010-0026301 A | 3/2010 |
| WO | 2020/206476 A1 | 10/2020 |

* cited by examiner

ASSEMBLY FOR GRANULATING EXTRUDED MATERIAL

This application is a U.S. National Phase Application of PCT/AT2020/060361, filed Oct. 9, 2020, which claims the priority of Austrian Patent Application A50870/2019, filed Oct. 11, 2019, the entireties of which are incorporated by reference herein.

The invention relates to an arrangement for granulating plasticised, or at least partially softened, or at least partially melted, preferably extruded, material.

Such arrangements are known, for example, from EP 2 052 825 A2. With this arrangement, the separation and discharge of the granulate particles coming out of the extruder is not optimal and there are also deposits in the transport path.

The object of the present invention is to improve the granulation of plasticised materials, i.e. softened, partially softened, partially melted to melted, thermoplastic or at least partially thermoplastic particles, preferably polymer particles, with a simply constructed arrangement.

The main objective is to solidify the separated particles as quickly as possible, preventing both mutual collision of the particles and collision of the particles with the inner walls of the housing or the other lines carrying the particles away.

According to the invention, it is provided that in a plane E-E or sectional plane parallel to the plane of the perforated plate and/or the front wall of the housing, the two lateral wall surfaces of the gas discharge line, which are perpendicular to this plane, enclose an angle $\alpha 2$ with one another, and the two lateral wall surfaces of the gas supply line, which are perpendicular to this plane E-E, enclose an angle $\alpha 1$, wherein the two angles $\alpha 1$, $\alpha 2$ open towards the housing and wherein the angle $\alpha 1$ is larger than the angle $\alpha 2$, and in that a transition housing is arranged or installed between the housing and the gas discharge line. It has been shown that the desired effects can be achieved if the special structural and geometrical specifications and dimensions for the arrangement according to the invention are observed. It is ensured that the particles can be carried along by the gas flow safely and without mutual interactions. Especially by the arrangement of a transition housing, which is located between the housing and the gas discharge line, the removal of the particles from the housing takes place optimally, in particular the separation of the particles is supported.

A feeding or plasticizing unit is arranged upstream of the arrangement according to the invention, which prepares and provides the materials to be granulated. The feeding or plasticizing unit can be of any design. The material strands conveyed from this unit to the perforated plate and exiting the perforated plate are cut to granules in practical operation with scrapers, e.g. knives, ductors or the like. As a scraper, for example, an arrangement with one or more rotating knives can be used, which are mounted on a knife carrier and, as in the case according to the invention, are driven by a drive located outside the housing, e.g. an electric motor. The perforated plate and the scraper driven by a motor are the main components of the granulating unit.

For cutting, the material strands are pressed into the specially shaped housing, with a gas flow being introduced into this housing from one side, advantageously from below. This gas flow is generated by means of a blower. The gas flow through the housing can consist of air, advantageously dried and/or cooled and/or tempered air, thus also of noble gases or reactive gases or gas mixtures of any kind.

A transition housing is connected to the housing, in particular on its side opposite the gas supply line, and a gas discharge line is connected to the transition housing. Like the gas discharge line, the transition housing represents an independent component in the transport path of the granulate particles. Both the transition housing and the gas discharge line connected to the transition housing are specially shaped to ensure both the complete discharge of the formed granules quickly and to keep the formed granules separated and free of contact with each other and with the inner walls. The gas flow is supplied from one side of the housing via the gas supply line into the housing in the area of the perforated plate and the gas flow is discharged or the particles are removed from the area of the perforated plate from an opposite area of the housing via the transition housing into the gas discharge line. Contact of the granules with the walls of the housing or the inner walls of the housing is largely prevented or minimised, and deceleration and/or deposition of the granulate particles is prevented. Sticking of the formed granulate particles to the inner walls is also avoided. It is essential, however, that the granulate particles are prevented from sticking together to the greatest possible extent according to the invention.

The granules formed are transported with a medium, in particular a gas, passed through the arrangement. This gas can be any gas or gas mixture, in particular air is used. The gas stream used transports the particles out of the housing, whereby these material particles or granulates or sausages or the like can be cooled and/or solidified and/or chemically reacted out with the aid of the gas stream, e.g. by thermal influence, cooling or by a reaction initiated or induced by the gas.

The materials to be granulated, e.g. polymers, can be reinforced with fibres and/or also partially crosslinked. They can be based on polyesters, polyolefins or even polyamides. In principle, it is possible to transport all at least partially plasticizable, preferably extrudable, materials, provided that they can be softened or melted and converted or solidified into particles, with the arrangement according to the invention from the exit point or point of their formation in front of the perforated plate and to treat them physically or chemically during the transport away or to allow them to react or solidify. The arrangement according to the invention can be used for all materials for which forming of strands into a granulate is feasible. These include doughs, ceramic masses, rubber, thermoplastic polyurethanes, silicones, etc.

Basically, it should be possible to achieve the solidification of the materials by the gas used, especially air. Evaporating media can also be used, such as water, if a solidification of the extruded materials to be formed into particles can be achieved when water or such media evaporate. In the case of evaporation, the cooling that occurs in the process can also be exploited, especially if no significant condensation and no liquid phase become dominant.

The term "transitional housing" is used here to refer to a defined component. The transition housing is additionally installed as a further component between the housing and the gas discharge line. The transition housing is manufactured as an independent component or module and is located between the housing and the gas discharge line. Other essential units of the device, namely the housing, the gas supply line and the gas discharge line, are also manufactured in modular form and then assembled. Accordingly, the transition housing represents a modularly constructed connecting line between the housing and the gas discharge line. The transition housing, like the gas discharge line, is an independent component in the transport path of the granulate particles. The gas or granules therefore do not enter the module of the gas discharge line directly from the housing, but must first pass through the transition housing and pass through it completely.

Only then do they enter the gas discharge line.

The features of some embodiments represent preferred further developments of the arrangement with special technical effects:

A considerable improvement in granulation is achieved if, in a preferred embodiment of the invention, it is provided that, in the plane parallel to the plane of the perforated plate or in the sectional plane, the mutual distance of the side walls of the housing, which are perpendicular to this plane, in their downstream end region, and the mutual distance of the adjoining lateral wall surfaces of the transition housing, which are also perpendicular to this plane E-E, have a value b, in particular the same value b, of $10*d \geq b \geq 4*d$, preferably $8*d \geq b \geq 5*d$. The value of d is calculated by determining the common area centre of gravity of all perforated plate recesses available for a material passage. For each recess, the distance of its own area centre of gravity from the common area centre of gravity is determined, and the distance values determined for the existing recesses are arithmetically averaged, and twice the value of the arithmetic mean is set as the value d.

The value b thus corresponds to the greatest mutual distance between the side walls of the housing and the greatest mutual distance between the lateral wall surfaces, adjoining these side walls, of the transition housing at its upstream end region. Thus, a vortex-free transition from the housing to the transition housing is achieved with simple manufacturing, whereby the conditions for optimal particle transport are given.

A preferred, flow-favourable embodiment counteracting a deposition of the particles provides that the two side wall surfaces of the gas discharge line, which are perpendicular to a plane E-E or perpendicular to a plane perpendicular to the plane B-B of the perforated plate, enclose an angle $\beta 2$ with one another, and the side wall surfaces of the gas supply line, which likewise extend perpendicularly to a plane perpendicular to the plane E-E or perpendicular to a plane B-B perpendicular to the perforated plate, enclose an angle $\beta 1$ with one another, wherein the two angles $\beta 1$, $\beta 2$ open away from the housing and wherein the angle $\beta 1$ is larger than the angle $\beta 2$.

It is further advantageous if the central axis of the feeding or plasticizing unit, preferably of an extruder, and/or the common area centre of gravity of all the recesses present and/or the centre line of the perforated plate running through the area centre of gravity lie centrally with respect to the side walls of the housing and/or lie in a plane of symmetry, perpendicular to the plane of the perforated plate and containing the centre line of the housing, of the gas supply line and/or of the gas discharge line and/or of the transition housing and/or housing. The position of the perforated plate in relation to the housing or transition housing plays an important role in the separation of the shaped particles and the transport behaviour of the arrangement.

The perforated plate with the recesses for the passage of the material to be granulated or a vertical centre line of the perforated plate running through the area centre of gravity of the recesses of the perforated plate can be located in the centre of the housing or run through it. This centre is located centrally between the side walls of the housing or on a plane of symmetry perpendicular to the plane of the perforated plate and running in the direction of flow through the housing, which contains the longitudinal centre line of the 10 housing. However, the centre can also be determined by the intersection points of the respective surface diagonals of the front wall and/or the rear wall of the housing.

For a number of applications, in particular for sticky materials, it has proved useful if the central axis of the feeding or plasticizing unit, preferably of the extruder, and/or the common area centre of gravity of all the recesses present and/or the centre line of the perforated plate running through the latter is offset laterally with respect to a centre line of the housing and/or with respect to a plane of symmetry of the gas supply line and/or the gas discharge line and/or the transition housing which is perpendicular to the plane of the perforated plate and contains the centre line of the housing and/or with respect to the centre between the side surfaces of the housing which are perpendicular to the plane E-E. The lateral offset takes place by a value c, with $c \leq 2.5*d$, in the area of the housing where the direction of rotation of the scraper and the direction of gas flow are in the same direction. The perforated plate or its centre is thus offset in relation to the centre of the housing or the centre line of the housing. The offset is thus such that-viewed from the face of the housing towards the exit of the material from the perforated plate—there is a larger wall distance in that area in which the rotating tools or knives of the scraper move against the main air flow. Separated particles receive an impulse against the conveying direction of the air flow during separation, but slow down as they move against the conveying direction of the air. The risk of such particles hitting the housing wall is reduced by this measure.

Particularly sticky materials are materials for which, after the granulate particles have been separated, the cooling time in the gas stream, as used in practice, is not sufficient to significantly reduce the stickiness of these granulate particles. This considerably increases the risk of colliding granulate particles sticking together or building up on the inner wall of the housing. Therefore, in such cases, the perforated plate is not arranged centrally in the housing, but the perforated plate is offset relative to the longitudinal centre line or longitudinal centre symmetry axis of the housing, thus forming a larger wall distance in that area where the rotating blades of the scraper move against the direction of the gas flow.

For sticky materials in particular, it can be further advantageous if the central axis of the feeding or plasticizing unit, preferably of an extruder, and/or the common area centre of gravity of all the recesses present, or a centre line of the perforated plate running through the latter, is located opposite the point or cross-sectional area of the housing, at which-viewed in the direction of flow—the side walls of the widening housing have assumed the mutual distance b, is arranged upstream at a distance a, wherein a is $\leq 1.1*d$. In practice, it is envisaged that the housing is fixed and the axis of the feeding or plasticizing unit is displaced or offset relative to the housing. In practice, the perforated plate is offset in relation to the housing in the direction of flow.

It has proven advantageous if, in the transition region or at the transition or at the transition surface from the housing to the transition housing, the housing and the transition housing have the same rectangular cross-sectional area, wherein the length of the longer rectangular side has the value b. This results in a vortex-free transition from the housing to the transition housing. In this context, it is also advantageous if the cross-sectional area of the housing in the transition region to the transition housing or if the cross-sectional area (16) is larger by 5 to 20% only, preferably 10 to 15%, than the cross-sectional area of the gas discharge line in its end region remote from the housing.

Furthermore, it is advantageous to make the cross-sectional area of the housing at the level of the perforated plate 25 to 35% larger than the cross-sectional area of the gas supply line in its upstream end or its connection to the blower. This results in largely vortex-free transport over the entire arrangement with a nozzle effect in the housing. It is also advantageous if the cross-sectional area of the housing increases by 10 to 20% from the height of the perforated plate to the transition region to the transition housing or to the cross-sectional area (16) for forming a diffuser.

For the transition housing adjoining the housing, it is advantageous if the length of the transition housing in the direction of flow is 35 to 100%, preferably 50 to 90%, of the length of the housing.

The cross-sectional area of the transition housing conveniently decreases by 20 to 45% from its housing-side end region to its downstream end region, or to the initial region of the gas discharge.

In order to reduce the mutual contact of the granulate particles, it is advantageous if, in a plane E-E parallel to the perforated plate, the opposing side wall surfaces of the housing have, at least over a partial region of their longitudinal extent, a convexly curved, in particular continuous, course diverging from the gas supply line towards the transition housing as seen from the interior of the housing. The transitions between the individual sections are advantageously designed in the form of round, arc-shaped elements, but can also be implemented in a segmented design. In the case of segmentation, however, problems can arise with regard to the accumulation of dust and material in the corners and edges even at small angles at the segment transitions. Furthermore, the quality of the airflow in such areas decreases, as undesirable turbulence can occur there.

Preferably, the front wall and the rear wall of the housing and/or the front wall and the rear wall of the transition housing are aligned parallel to one another and/or parallel to the plane of the perforated plate. The parallel wall sections through which the gas flows in the housing improve the discharge of the separated particles towards the transition housing or the gas discharge or the nozzle effect.

A simple structure of the application according to the invention results if the scraper has a drive shaft which runs in the housing from the rear wall of the housing to the perforated plate located in the area of the front wall of the housing and representing the end area of the feeding or plasticizing unit, preferably of the extruder. A flow-favourable connection to units for further processing or treatment of the granulate particles results if a transition part is connected to the gas discharge line, which changes the rectangular cross-section of the gas discharge into a cross-section with a round or curved circumference. The transition part may have wall sections tapering downstream, which wall sections join the lateral wall surfaces or sidewall surfaces of the gas discharge inclined at the same angle $\alpha 2$ or the same angle $\beta 2$ as these or extend these, in particular in the form of triangles.

An advantageous structure of the arrangements with respect to particle transport and prevention of their sticking together is obtained when the vertex of the angles $\alpha 1$, $\alpha 2$ and/or $\beta 1$, $\beta 2$ lies on the centre line or on a longitudinal plane of symmetry through the gas supply line and/or the housing and/or the transition housing and/or the gas discharge line, in particular running parallel to or containing a centre line of the perforated plate or central axis of the supply or plasticizing unit.

It has been found to be favourable for particle transport if the angle $\alpha 2$ is 0.3 to 0.9 times, preferably 0.5 to 0.8 times, that of angle $\alpha 1$. Sticking together of the particles is reduced if the angle $\alpha 1$ is <90° and is preferably in the range from 10° to 80° and in particular an acute angle of 15° to 45°, and/or if the angle $\alpha 2$ is <90° and is in particular an acute angle, preferably in the range from 3° to 35°, in particular from 6° to 30°.

It is also favourable for particle transport if the angle $\beta 2$ is 0.1 to 0.45 times, preferably 0.15 to 0.35 times, the angle $\beta 1$.

In order to further reduce the sticking together of the particles, it is advantageous if the angle $\beta 1$ is <90° and in particular is an acute angle, preferably in the range from 10° to 60°, in particular from 15° to 50°, and/or if the angle $\beta 2$ is <90° and in particular is an acute angle, preferably in the range from 2° to 30°, in particular from 4° to 15°.

It is space-saving and advantageous for industrial applications if the gas supply line, the housing, the transition housing and the gas discharge line are arranged or assembled vertically one above the other. In principle, a horizontal or inclined arrangement of gas supply lines and/or housing, transition housing and gas discharge line is also possible.

It is expedient if the side wall surfaces of the transition housing, which are perpendicular to the plane E-E of the perforated plate, are at least partially convexly curved—as seen from the inside—and converge downstream towards the gas discharge line, wherein the side wall surfaces of the transition housing run perpendicular to the plane E-E of the perforated plate if necessary.

It is structurally simple and convenient for maintenance if the end surface or end border of the transition housing and the initial area or initial border of the gas discharge line have the same inclination to the longitudinal or centre line or to the plane E-E of the perforated plate and the end surface of the transition housing is inclined at an angle $\gamma=40$ to 90°, preferably 50 to 80°, to the centre line or plane of the perforated plate, whereby the angle $\gamma$ opens towards the feeding or plasticizing unit.

This structure is particularly favourable if it is provided in accordance with the invention that the gas supply line, the housing and the transition housing are formed or assembled as one unit, and the supply or plasticizing unit and the gas discharge line supported by a carrier are formed together as a further unit, at least one of the two units being pivotally mounted relative to the other unit. In this way, access to the inside of the housing and the transition housing is easily possible.

For the safe, rapid and, if possible, collision- and deposit-free transport of the particles, the angles $\alpha 1$, $\alpha 2$ and, in an advantageous embodiment, also $\beta 1$, $\beta 2$ between the respective wall surfaces of the gas supply line and the gas discharge line as well as the geometry of the housing and the transition housing are of importance. The values b and d as well as the expansion or widening of the housing downstream of the perforated plate also have an influence on deposit-free particle agglomeration.

The invention is illustrated below by way of example in preferred embodiments which are not to be understood as restrictive.

Figure 1:
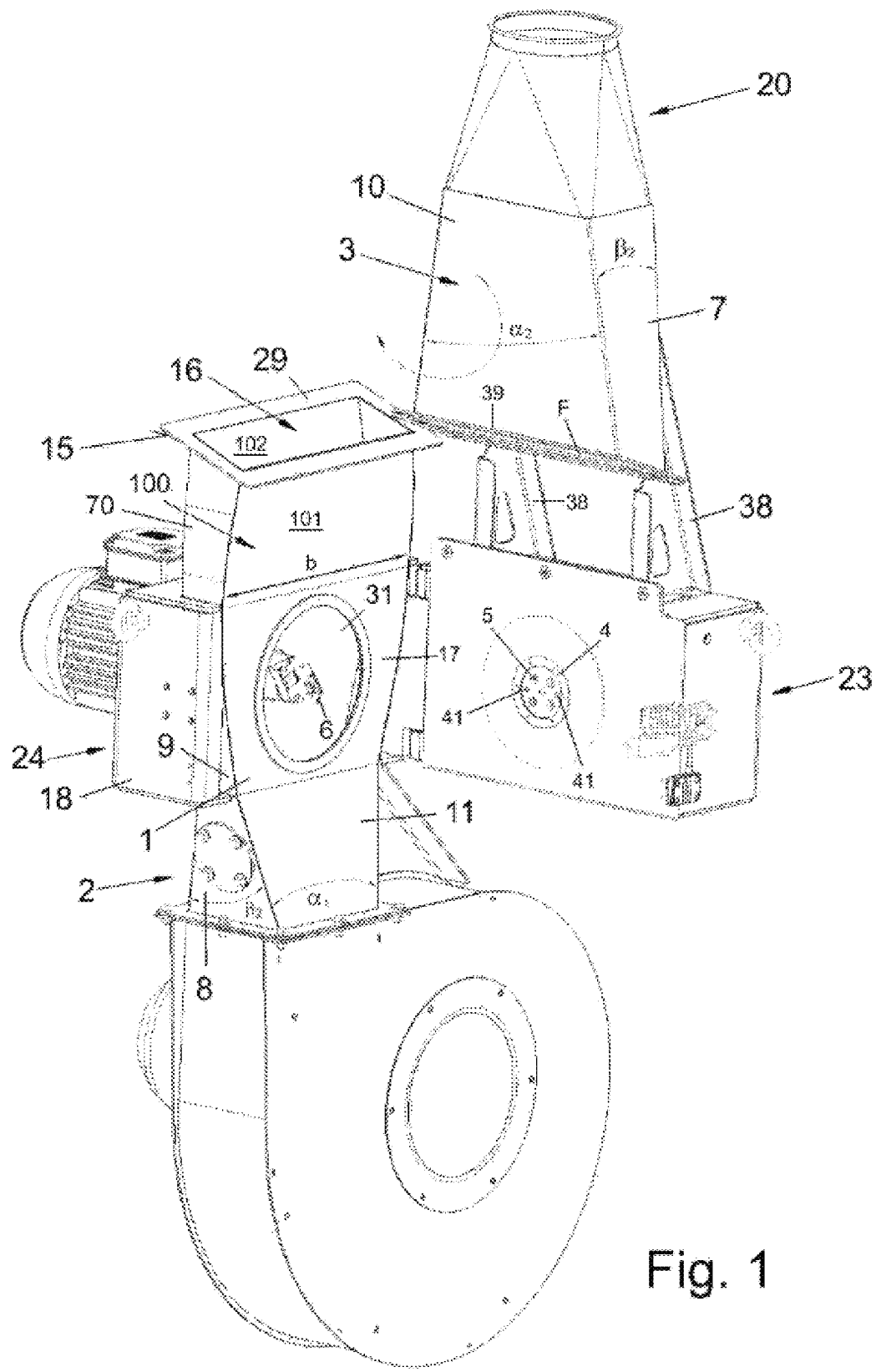
FIG. 1 shows a schematic, perspective view of the arrangement according to the invention, wherein the right-hand part of the figure shows the unit of the arrangement connected to the feeding or plasticizing unit, preferably an extruder, on which the further unit of the arrangement according to the invention shown on the left is pivotally mounted.
Figure 2:
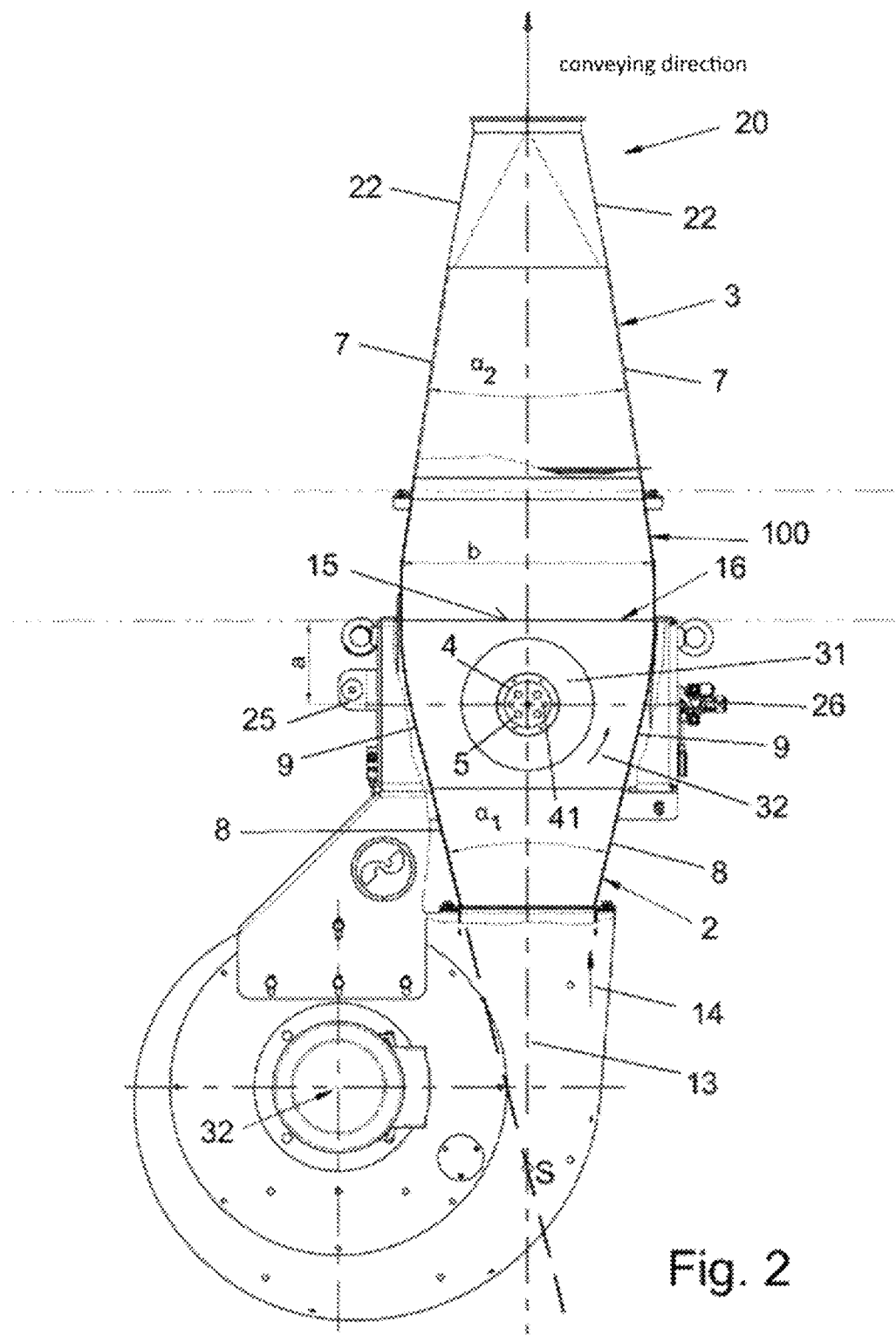
FIG. 2 shows a sectional view E-E of the arrangement according to FIG. 3, with the viewing direction being in the direction of the extruder connected to the arrangement.
Figure 3:
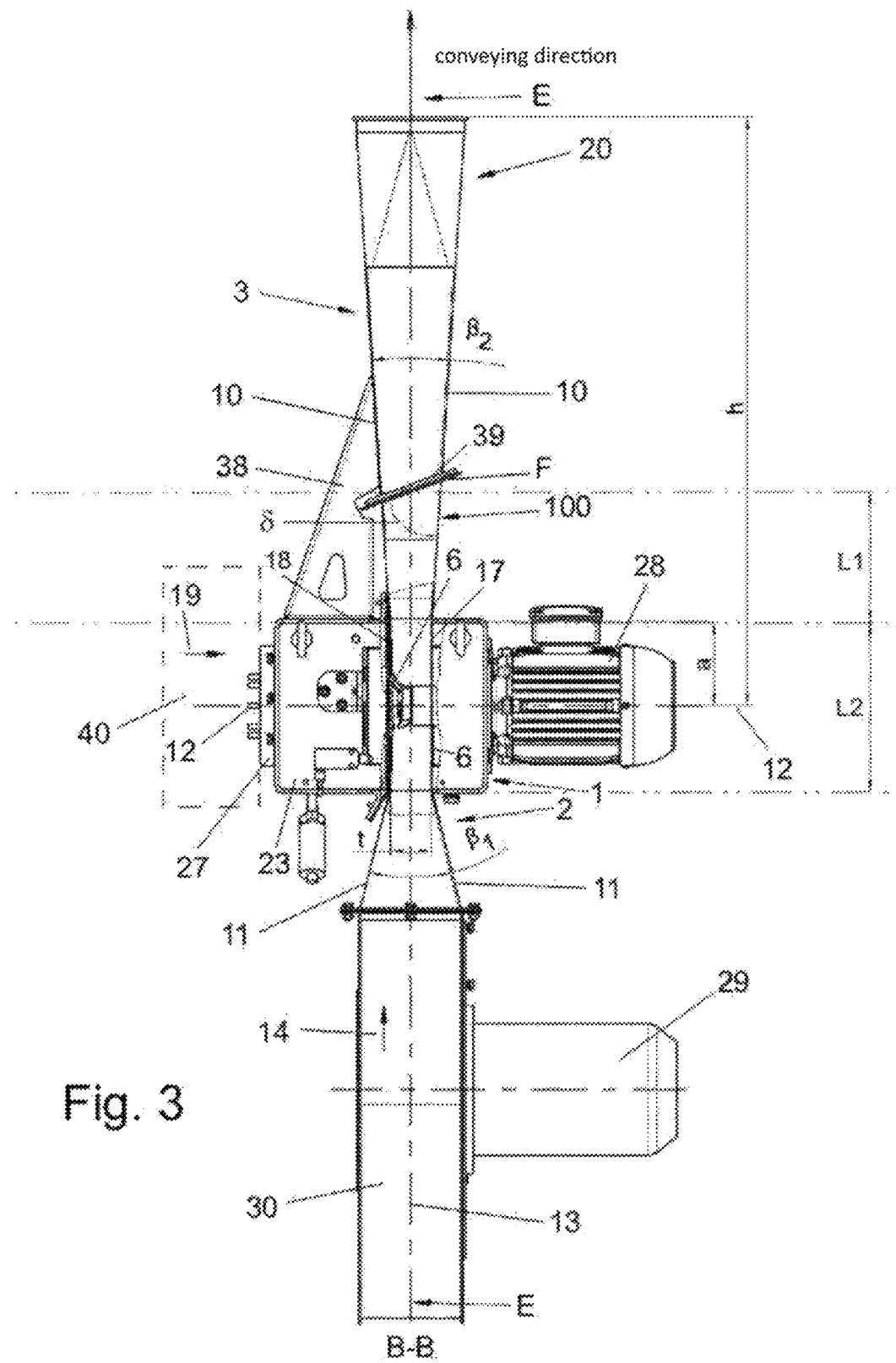
FIG. 3 shows a section B-B according to FIG. 2.

The arrangement according to the invention is arranged downstream of or connected to any feeding or plasticizing unit 40, preferably an extruder. Unit 40 is in FIG. 3 only indicated and has an end area or end part 27 which is closed off by a perforated plate 4. The end portion 27, as shown in FIGS. 1 and 2, are received by or connected to a box-shaped support part 23 of a housing 1. The perforated plate 4 for the material outlet opens into the housing 1. The conveying direction of the unit 40 is shown in FIG. 3 schematically with an arrow 19. Such a unit 40 may also be formed by a pressure line conveying plasticised and/or molten material, which is terminated by the perforated plate 4.

Like FIG. 1 shows, a housing 1 and a transition housing 100 lie between a gas supply line 2 and a gas discharge line 3. The front wall 17 and rear wall 18 of the housing 1 run parallel to each other. In the abutting or pivoted-in position of the support parts 23, 24, the perforated plate 4 opens into the housing 1 through a recess 31 in the front wall 17. Furthermore, the drive shaft of a wiper 6 projects into the housing 1. The drive shaft of the wiper 6 extends through the rear wall 18 and is driven by a motor 28.

As shown in FIG. 1, the support part 24 is pivotably mounted on the support part 23 by means of a pivot bearing 25 that can be configured as desired, which in turn supports the motor 28 and the scraper 6 driven by the motor 28 via a drive shaft. The scraper 6 comes into contact with the perforated plate 4 when the support part 24 is swung onto the support part 23, where it can scrape off the material exiting through the perforated plate 4. In this way, granulate particles can be formed in the housing 1 while simultaneously being transported away with a gas stream passing through the housing 1.

The pivot bearing 25 for the support parts 23, 24 is provided to allow maintenance work to be carried out easily inside the housing 1 or to gain access to the wiper 6 and the perforated plate 4. In principle, the other support part 24 can also be fixed and the support part 23 can be mounted on it.

The support part 23 carries, via supports 38, in its upper region the gas discharge line 3 in the form of a tapering tube or channel with four edges running in the direction of flow or a rectangular cross-sectional area, which is adjoined by a transition part 20 with wall sections 21, 22, which ends with a rounded cross-section. The wall sections 21 and 22 each have the same slope as the side wall surfaces 7 and 10, respectively, of the gas discharge line 3.

In the end region of the housing 1 opposite the gas supply line 2, a transition housing 100 is attached or inserted between the housing 1 and the gas discharge line 2, which represents a transition from the housing 1 to the gas discharge line 3. When the support part 24 is pivoted in, the transition housing 100 rests with its upper or housing-remote end edge 29 or end surface or its upper opening cross-section 29 against an initial edge 39 or initial area or cross-sectional edge or cross-sectional surface 39 of the gas discharge line 3 adapted to this end edge or opening cross-section 29. Thus, gas flowing into the housing 1 from below via the gas supply line 2 can be directed into the gas discharge line 3 via the housing 1 and the transition housing 100 by a blower 30, with the gas flowing past the perforated plate 4 and the wiper 6. The perforated plate 4 opens into the housing 1 through an opening 31 in the front wall 17 of the housing 1. In principle—as shown—the perforated plate 4 can close off the housing with the front wall 17 or project into the housing 1. In this way, the strands of material exiting the perforated plate 4 can be separated by the scraper 6 and carried directly by the gas stream.

The gas supply line 2 leading to the housing 1 is connected to the blower 30. As shown in FIG. 2, the lateral wall surfaces 8 of the gas supply line 2, which run perpendicular to the plane of the perforated plate 4 or a sectional plane E-E or to the front wall 17 and rear wall 18 of the housing 1, are inclined at an angle $\alpha 1$ with respect to one another, the vertex S of this angle $\alpha 1$ lies on the centre line between these two wall surfaces 8 or on the centre line 13 of the housing 1 or on a longitudinal axis of symmetry of the housing 1. In the illustrated embodiment, the angle is $\alpha 1=27°$ and its vertex S is below the axis of the rotor.

The two wall surfaces 8 of the gas supply line 2 are adjoined by the side walls 9 of the housing 1, which diverge downstream and, viewed from the inside over a downstream section, are slightly convexly curved. In the downstream end region of the housing 1, the housing 1 shows a clearance or distance b between the side walls 9. The transition housing 100 is attached to this end region of the housing 1 in the form of a module.

The lateral wall surfaces 7 of the gas discharge line 2 enclose with each other an angle $\alpha 2$, the vertex of which lies downstream of the housing 1 or the gas discharge line 3. The angle $\alpha 1$ is larger than the angle $\alpha 2$. The angle $\alpha 2$ is 19° in the case shown.

In principle, the transition housing 100 represents a modularly constructed connecting line between the housing 1 and the gas discharge line 3. The gas inlet area of the transition housing 100 corresponds in cross-section to the gas outlet area of the housing 1. The cross-sectional area of the downstream end region of the transition housing 100 corresponds to the cross-sectional area F of the connected gas discharge line 3. In principle, the wall surfaces of the transition housing 100 can be flat or at least partially curved. In principle, it is also possible for the opposing or all wall surfaces of the transition housing 100 to have the same inclination, at least in sections, as the respective adjoining wall surfaces of the gas discharge line 3, or for the corresponding edges of the wall surfaces of the transition housing 100 and of the gas discharge line 3 to include the same angles between them. Advantageously, the wall surfaces of the transition housing 100 extend in a curved manner from the housing 1 to the gas discharge line 3 or are formed with a plurality of wall section segments to form a curved conduit.

The transition housing 100 is manufactured as an independent component or module and is arranged between the housing 1 and the gas discharge line 3. The other units of the device, such as housing 1, gas supply line 2 and gas discharge line 3, are also manufactured in a modular fashion and then assembled. The transition housing 100 thus represents a modularly constructed connecting line between the housing 1 and the gas discharge line 3. The transition housing 100, like the gas discharge line 3, is thus an independent component in the transport path of the granular particles.

Like FIG. 1, the housing 1 and the transition housing 100 lie between the gas supply line 2 and the gas discharge line 3. When the support part 24 is pivoted in, the transition housing 100 rests with its upper end edge 29 against the initial edge 39 of the gas discharge line 3, which is adapted to this opening cross section. The gas or the granules therefore do not enter the gas discharge module 3 directly from the housing 1, but must first pass through the transition housing 100 and pass through it completely. Only then do they enter the gas discharge line 3.

From FIG. 3 the angle β1 can be seen which, in the case of the gas supply line 2 leading to the blower 30, is enclosed by the two side wall surfaces 11 perpendicular to a plane running perpendicular to the sectional plane E-E or to the plane of the perforated plate 4. The angle β1 is larger than the angle β2 formed by the two side wall surfaces 10 of the gas discharge line 3, which are also perpendicular to this plane E-E. The vertex of the angle β1 is downstream of the gas supply line 2 in the housing 1. The vertex of the angle β2 lies upstream of the gas discharge line 3 and upstream of the housing 1 in the gas supply line 2. The angle 2 in the case shown is 7.5°, the angle β1 is 27°.

In operation, the blower 30 is driven by the blower motor 28 and conveys a gas flow via the gas supply line 2 into the housing 1, which gas flow removes the granulate particles separated by the scraper 6 at the perforated plate 4 from the housing 1 and entrains them via the transition housing 100 into the gas discharge line 3. These particles in the form of granules, sausages or irregularly shaped bodies can be solidified in or with the aid of the gas flow. This solidification may be due to a thermal effect, e.g. cooling or drying effect of the gas stream, or chemical reactions induced by the gas stream itself.

The cross-section or cross-sectional area of the housing 1 in its downstream end region shows in FIG. 1 a lateral edge or distance b between the lateral wall surfaces 9, which is related to a value d characteristic of the perforated plate 4. This value d is calculated as in FIG. 7 explained in more detail, is determined by the position, shape and number of the recesses 5 which determine the cross-section of the material to be granulated, since in practice perforated plates 4 used for different materials have irregularly distributed and/or unequally sized and/or unequally shaped and/or have a different number of recesses 5. To determine the value d, the common area centre of gravity FS is determined for all existing recesses 5. Furthermore, the distance A of the area centre of gravity S of the respective recess 5 from the common area centre of gravity FS is determined for each recess 5. The values for the distance A determined for all recesses 5 present are arithmetically averaged. The double value of the arithmetic mean then corresponds to the value d.

Figure 7:
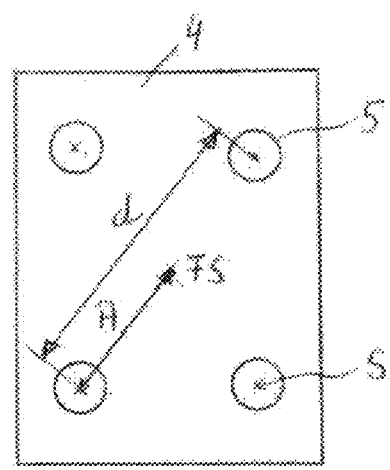
FIG. 7 shows a sketch for determining the value b.
Figure 7:
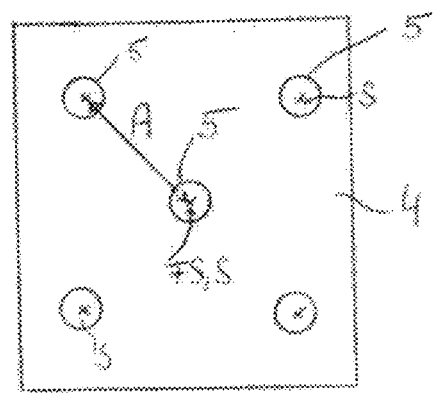

As shown in FIG. 7, four recesses 5 are arranged in a perforated plate 4, each at the corner points of an imaginary rectangle. Each of these recesses has as its area centre of gravity S its centre point, since the recesses are circular in shape. The common area centre of gravity of the four recesses 5 is located in the centre of these four recesses 5 and is designated FS. The distance between this common area centre of gravity FS and the individual recesses 5 is denoted by A. The distance A is the same for each of the four recesses 5, so that the sum to be formed for the arithmetic mean is $4*A$. After determining the arithmetic mean, which has the value A, the result is thus a value $d=2*A$, which is dependent on the perforated plate 4. This type of determination can also be used without further ado for recesses 5 having an elliptical cross-section or for circularly arranged arrangements 5. In the case of irregularly shaped recesses 5 or recesses with different shapes, the area centre of gravity S of each recess must be determined, and the common area centre of gravity FS can then be determined from the sum of the individual area centres of gravity S.

Figure 4:
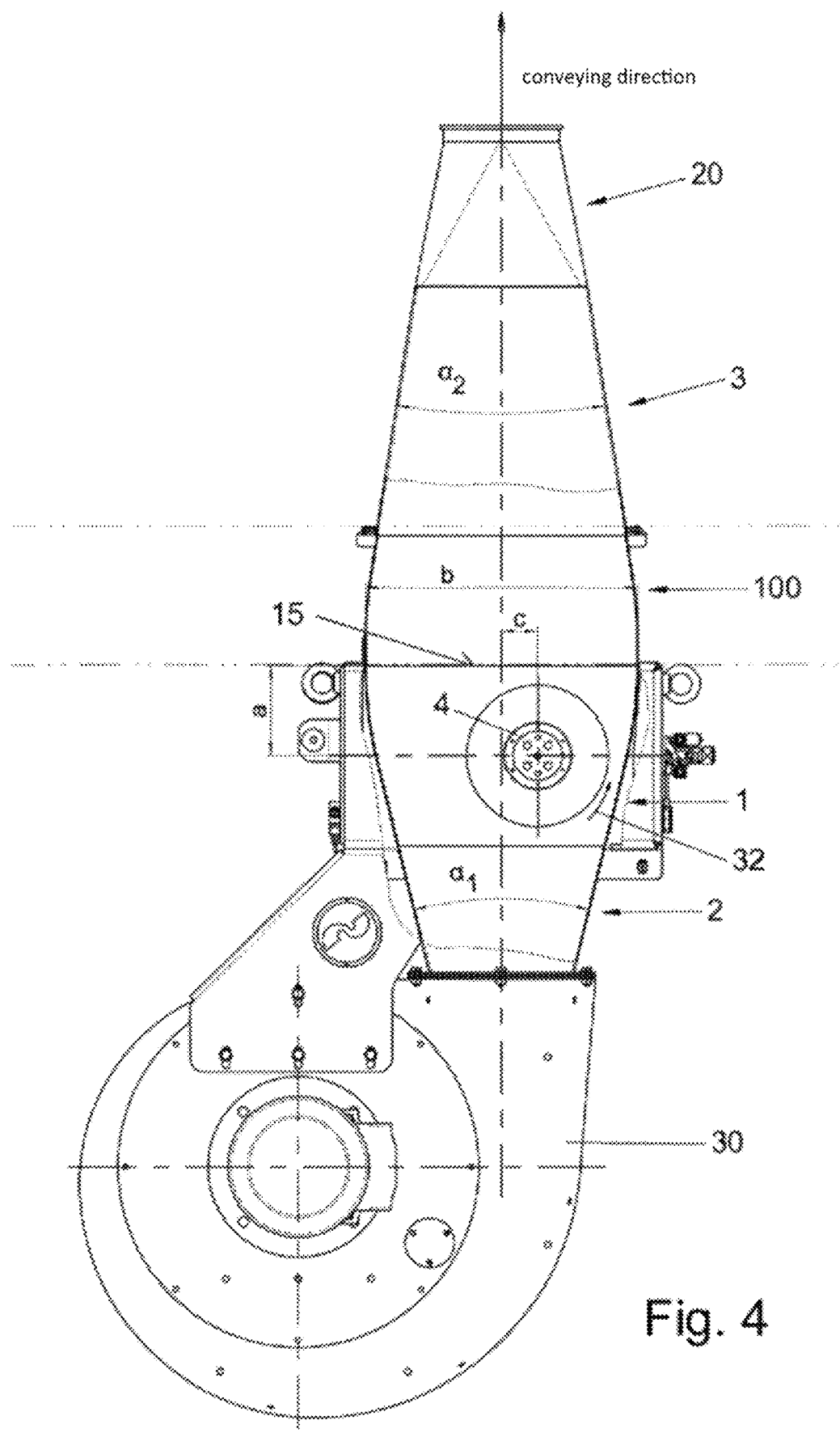
FIGS. 4 and 5 show different embodiments concerning the position of the arrangement or housing with respect to the extruder shaft and a perforated plate of the extruder, respectively.
Figure 5:
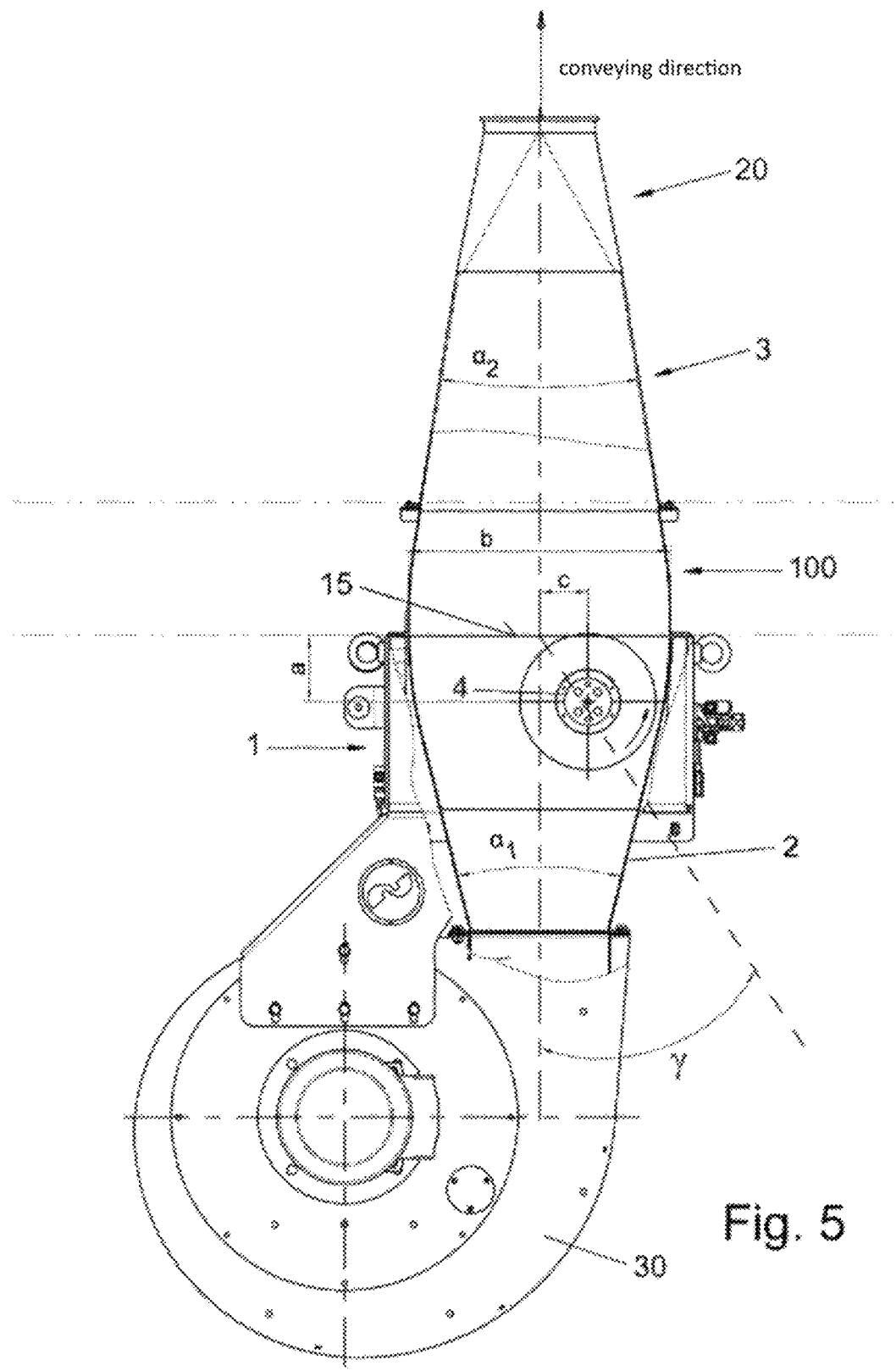

In FIGS. 4 and 5 perforated plates 4 are shown whose recesses 5 are arranged at the corners of a square, with a further recess 5 located at the diagonal intersection of this square. The value d is thus the length of the diagonal of this square, at the corners of which the area centre of gravity or area centres of gravity of the circular recesses 5 are located. In FIG. 7 below, this arrangement of recesses 5 is shown more clearly. This determination of d also applies to the perforated plate 4 according to FIG. 1, which has five recesses 5, and is provided with two fastening recesses 41.

In the case of the embodiment shown in FIGS. 1 and 2, the axis of the end part of the feeding or plasticizing unit 27 or the extruder axis as well as the centre line 12 of the perforated plate 4 passing through the common area centre of gravity FS and perpendicular to the plane of the perforated plate 4 intersect the longitudinal centre line 13 of the housing 1. For sticky materials, however, it may prove advantageous if an eccentric offset of the perforated plate 4 or its centre line 12 relative to or laterally to this centre line 13 occurs. Particularly with highly sticky materials, there is a risk that separated particles will collide with each other or come into contact with the inner wall surface of the housing 1 and stick to each other or build up on the housing 1 and obstruct the passageway.

It has therefore proved advantageous if—as shown in FIGS. 4 and 5—the centre line 12 of the perforated plate 4 or the axis of the feeding or plasticizing unit 27 or the area centre of gravity FS of the perforated plate 4 is offset laterally by an amount c relative to the centre line 13 of the housing 1. This offset takes place horizontally or transversely to the direction of flow in a plane parallel to the perforated plate 4. However, depending on the material, it is also possible for this offset to take place vertically or in or against the direction of flow, if necessary in addition to an offset taking place transversely to the direction of flow.

The maximum lateral offset c depends on the value d, wherein it has proven to be extremely favourable in practice if it is specified that $c \leq 2.5*d$. The value of c is selected depending on the material and particle size and is adjustable. In the case shown, $c=0.9*d$.

Upstream or downstream, or vertically downward or upward, an offset by a value $a \leq 2.2*d$ can be made. In the present case, the downstream offset has a value of $a=1.2*d$.

The lateral offset according to FIGS. 4 and 5 is made in the direction in which the direction of rotation 32 of the scraper 6 and the direction of flow of the gas stream through the housing 1 are in the same direction.

When an offset occurs transverse to or in the direction of flow, the result is an offset vector that is inclined at an angle γ to the longitudinal centre line 13, as can be seen from FIG. 5. The offset vector is selected depending on the material.

The axis of the feeding or plasticizing unit 27 and the centre line 12 of the perforated plate 4 coincide in the embodiments shown. The common area centre of gravity FS lies on this axis or centre line 12 of the perforated plate 4.

The centre line 13 of the housing 1 coincides with the centre line of the gas supply line 2 and/or the transition housing 100 and/or the gas discharge line.

Figure 6:
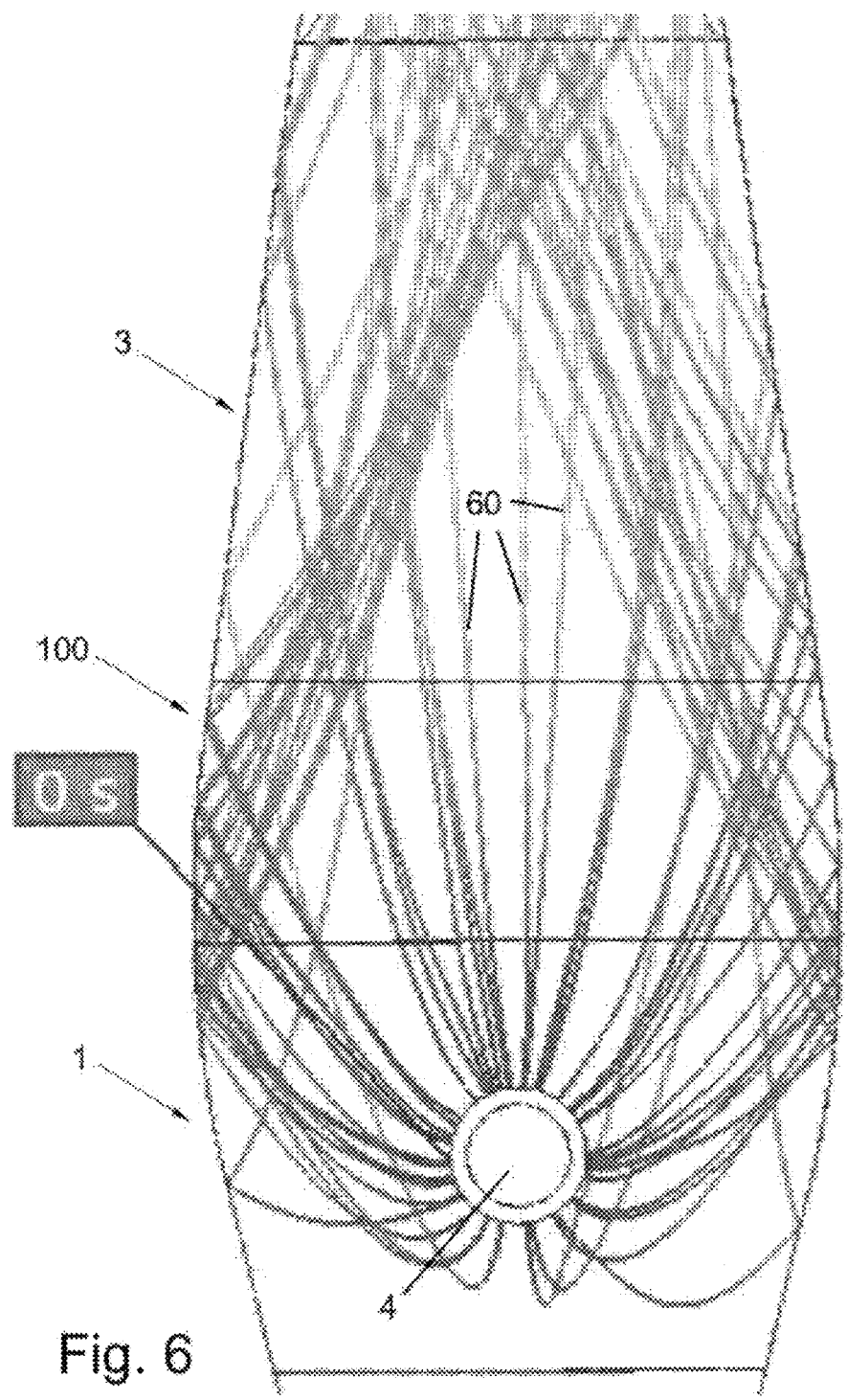
FIG. 6 shows a diagram.

FIG. 6 shows paths of the granulate particles exiting through the perforated disc 4 and separated by the scraper 6 in the housing 1 and in the gas discharge line 3. It can be seen that the particles are either immediately conveyed downstream or, after a fairly short movement caused by the scraper 6, are carried along by the gas stream against its direction of flow. It can also be seen that most of the particle paths 60 are unbroken, i.e. without collisions with the inner wall of the housing or the inner wall of the gas line. Particularly in the area immediately adjacent to the exit of the granulate particles from the perforated plate 4, which is important for the drying of the particles, extremely few particle collisions can be detected. The individual separated granulate particles follow independent trajectories and collisions with other granulate particles are almost non-existent.

The transition housing 100 is manufactured as an independent component or module and is installed between the housing 1 and the gas discharge line 3. The other units such as housing 1, gas supply line 2 and gas discharge line 3 can also be manufactured and assembled in a modular fashion.

As can be seen in particular from FIGS. 1, 2 and 3, it is provided that the end surface or end border 29 or end surface of the transition housing 100 and the initial border or initial area 39 of the gas discharge line 3 have the same inclination to the longitudinal or centre line or to the plane E-E of the perforated plate 4. The end edge or end surface 29 of the transition housing 100 as well as the circumferential cross-sectional area F of the gas discharge line 3 are inclined at an angle $\delta=70°$, with respect to the centre line or plane of the perforated plate 4, the angle being $\delta$ opens towards the feeding or plasticizing unit 40 or towards the support part 23. This ensures continuity of the gas flow and tightness of the system when the support parts 23, 24 are pivoted in.

In the embodiment shown in FIG. 2, the length L1 of the transition housing 100 is 75% the length L2 of the housing 1. The length of the transition housing 100 is measured on the centre line 13, in the plane B-B which is perpendicular to the plane E-E of the perforated plate 4.

The invention claimed is:

1. An arrangement for granulating plasticised or at least partially softened or at least partially melted material comprising a housing, a gas supply line opening into the latter and having a rectangular cross-section, a gas discharge line located downstream of the housing and a gas discharge line of rectangular cross-section located downstream of the housing, a granulating unit located at least partially in the housing and having a perforated plate of a feeding or plasticizing unit which feeds into and/or opens into the housing, and a scraper which comminutes or separates the material emerging through recesses of the perforated plate, characterised in that, in a plane or sectional plane (E-E) running parallel to the plane of the perforated plate and/or a front wall of the housing, two lateral wall surfaces of the gas discharge line, which are perpendicular to this plane, enclose an angle $\alpha 2$ with one another, and two lateral wall surfaces of the gas supply line, which are perpendicular to this plane, enclose an angle $\alpha 1$, wherein the two angles $\alpha 1$, $\alpha 2$ open towards the housing and wherein the angle $\alpha 1$ is larger than the angle $\alpha 2$, and that a transition housing is arranged or installed between the housing and the gas discharge line.

2. The arrangement according to claim 1, characterised in that in the sectional plane (E-E) or in the plane parallel to the plane of the perforated plate, a mutual distance of a side walls of the housing, which are perpendicular to this plane, in their downstream end region, as well as a mutual distance of the lateral wall surfaces of the transition housing, which are adjacent thereto and are perpendicular to this plane (E-E), have a value b of $10*d \geq b \geq 4*d$, preferably $8*d$, wherein the value of d is calculated by determining a common area centre of gravity (FS) for all existing recesses of the perforated plate, determining for each recess the distance of the area centre of gravity(S) of the respective recess from the common centre of gravity (FS), arithmetically averaging the distance values (A) determined for the existing recesses and fixing twice the value of the arithmetic mean as the value d.

3. The arrangement according to claim 2, characterised in that the value b corresponds to the greatest mutual distance between the side walls of the housing and the lateral wall surfaces, adjoining these side walls, of the transition housing at its upstream end region.

4. The arrangement according to claim 3, characterised in that the two lateral wall surfaces of the gas discharge line, which are perpendicular to a plane E-E or perpendicular to a plane B-B perpendicular to the plane of the perforated plate, enclose an angle $\beta 2$ with one another, and the side wall surfaces of the gas supply line, which extend perpendicularly to a plane E-E or perpendicular to a plane B-B perpendicular to the perforated plate, enclose an angle $\beta 1$ with one another, wherein the two angles $\beta 1$, $\beta 2$ open away from the housing and wherein the angle $\beta 1$ is larger than the angle $\beta 2$.

5. The arrangement according to claim 4, characterised in that the central axis of the feeding or plasticising unit, and/or the common area centre of gravity (FS) of all the recesses present or the centre line of the perforated plate running through the area centre of gravity (FS) lie centrally with respect to the side walls of the housing and/or lie in a plane of symmetry, perpendicular to the plane of the perforated plate and containing the centre line of the housing, of the gas supply line and/or of the gas discharge line and/or of the housing and/or of the transition housing.

6. The arrangement according to claim 4, characterised in that the central axis of the feeding or plasticising unit, and/or the common centre of gravity (FS) of all the recesses present and/or the centre line of the perforated plate running through the latter is offset laterally with respect to a centre line of the housing and/or with respect to a plane of symmetry of the gas supply line and/or of the gas discharge line and/or of the transition housing which is perpendicular to the plane of the perforated plate and contains the centre line and/or with respect to the centre between the side faces of the housing, the lateral offset being by a value c, with $c \leq 2.5*d$, in the region of the housing in which a direction of rotation of the scraper and a direction of the gas flow run in the same direction.

7. The arrangement according to claim 6, characterised in that the central axis of the feeding or plasticising unit, and/or a common surface centre of gravity of all the recesses present, or a centre line of the perforated plate running through the latter, is located opposite the point or cross-sectional area of the housing, at which—viewed in the direction of flow—the side walls of the widening housing have assumed the mutual distance b, is arranged upstream at a distance a, wherein a is $\leq 1.1*d$.

8. The arrangement according to claim 7, characterised in that in a transition region from the housing to the transition housing the housing and the transition housing have the same rectangular cross-sectional area, wherein the length of the longer rectangular side has the value b.

9. The arrangement according to claim 8, characterised in that the cross-sectional area of the housing in the transition region to the transition housing or the cross-sectional area is larger by 5 to 20% than the cross-sectional area of the gas discharge line in its end region remote from the housing, and/or that the cross-sectional area of the housing at a level of the perforated plate is 25 to 35% larger than the cross-sectional area of the gas supply line in its upstream end or its connection to a blower, and/or that the cross-sectional area of the housing increases by 10 to 20% from a height of the perforated plate to the transition region to the transition housing or to the cross-sectional area for forming a diffuser.

10. The arrangement according to claim 9, characterised in that in the plane (E-E) parallel to the perforated plate the opposite side wall surfaces of the housing have, at least over a partial region of their longitudinal extent, a convexly curved, course diverging from the gas supply line towards the transition housing as seen from the interior of the housing.

11. The arrangement according to claim 8, characterised in that the front wall and a rear wall of the housing and/or the front wall and the rear wall of the transition housing are aligned parallel to one another and/or parallel to the plane of the perforated plate.

12. The arrangement according to claim 11, characterised in that the scraper has a drive shaft which runs in the housing from the rear wall of the housing to the perforated plate located in the region of the front wall of the housing and constituting the end region of the feeding or plasticising unit.

13. The arrangement according to claim 12, characterised in that a transition part is connected to the gas discharge line, which transition part transitions the rectangular cross-section of the gas discharge line into a cross-section with a round or curved circumference, the transition part having wall sections (21, 22) tapering downstream, which wall sections joint inclined at the same angle $\alpha 2$ or the same angle $\beta 2$, the lateral wall surfaces or side wall surfaces of the gas discharge line or extend them in the form of triangles.

14. The arrangement according to claim 13, characterised in that a vertex(S) of the angles $\alpha 1$, $\alpha 2$ and/or $\beta 1$, $\beta 2$ lies on the centre line or on a longitudinal plane of symmetry through the gas supply line [(2)] and/or the housing and/or the transition housing and/or the gas discharge line, running parallel to a centre line of the perforated plate or central axis of the feeding or plasticising unit, or containing the same.

15. The arrangement according to claim 14, characterised in that the angle $\alpha 2$ is 0.3 times to 0.9 times the angle $\alpha 1$.

16. The arrangement according to claim 15, characterised in
that the angle $\alpha 1$ is <90°, and/or
that the angle $\alpha 2$ is <90°.

17. The arrangement according to claim 16, characterised in that the angle $\beta 2$ is 0.1 times to 0.45 times the angle $\beta 1$.

18. The arrangement according to claim 17, characterised in
that the angle $\beta 1$ is <90°, and/or
that the angle $\beta 2$ is <90°.

19. The arrangement according to claim 18, characterised in that the gas supply line, the housing, the transition housing and the gas discharge line are arranged or constructed vertically one above the other.

20. The arrangement according to claim 19, characterised in that the centre line of the perforated plate and the central axis of the supply or plasticising unit coincide.

21. The arrangement according to claim 20, characterised in that the length (L1) of the transition housing in the flow direction is 35 to 100%.

22. The arrangement according to claim 21, characterised in that the cross-sectional area of the transition housing decreases by 20 to 45% from its housing-side end region towards its downstream end region.

23. The arrangement according to claim 22, characterised in
that the side wall surfaces of the transition housing run downstream towards one another in an inclined and/or curved manner converging towards the gas discharge line and/or
that the side wall surfaces of the transition housing are perpendicular to a plane E-E parallel to the plane of the perforated plate.

24. The arrangement according to claim 23, characterised in that the end surface or end border of the transition housing and the initial area or initial border of the gas discharge line have the same inclination to the longitudinal or centre line or to the plane of the perforated plate, and the end surface or end border of the transition housing and the initial area or initial border of the gas discharge line have the same inclination to the longitudinal line or centre line or to the plane of the perforated plate extend at an angle to the centre line or plane of the perforated plate, the angle $\delta$ opening towards the feeding or plasticising unit.

25. The arrangement according to claim 24, characterised in that the transition housing is connected or attached to the wall of the housing opposite the gas supply line.

26. The arrangement according to claim 25, characterised in
that the gas supply line, the housing and the transition housing are assembled into one unit, and
that the feeding or plasticising unit and the gas discharge line are assembled to form a further unit, at least one of the two units being pivotable relative to the other unit.

27. The arrangement according to claim 26, characterised in that the transition housing is manufactured as an independent component or as a module and is additionally arranged or installed as a further component between the housing and the gas discharge line.

28. The arrangement according to claim 1, wherein the partially melted material comprises a polymer material.

* * * * *